(12) United States Patent  
Kuriakose et al.

(10) Patent No.: US 10,558,234 B2
(45) Date of Patent: Feb. 11, 2020

(54) WINCH MECHANISM FOR A CARRIER TRUCK

(71) Applicant: Oshkosh Corporation, Oshkosh, WI (US)

(72) Inventors: Sanjeev T. Kuriakose, Shippensburg, PA (US); Laura M. Carson, Martinsburg, WV (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 15/862,321

(22) Filed: Jan. 4, 2018

(65) Prior Publication Data

US 2018/0129241 A1 May 10, 2018

Related U.S. Application Data

(63) Continuation of application No. 13/940,955, filed on Jul. 12, 2013, now Pat. No. 9,880,581.

(51) Int. Cl.
*G05G 1/04* (2006.01)
*G05G 1/02* (2006.01)
(Continued)

(52) U.S. Cl.
CPC .............. *G05G 1/025* (2013.01); *B60P 3/122* (2013.01); *G05G 1/01* (2013.01); *G05G 11/00* (2013.01);
(Continued)

(58) Field of Classification Search
None
See application file for complete search history.

(56) References Cited

U.S. PATENT DOCUMENTS 5,207,552 A * 5/1993 Mummert ................. B60P 1/54
192/99 S
5,919,027 A 7/1999 Christenson
(Continued)

FOREIGN PATENT DOCUMENTS

CA 2584578 6/2013
CA 2811134 12/2014
(Continued)

OTHER PUBLICATIONS

Jerr-Dan Medium Duty Carrier Parts Manual, Rev 02—Mar. 1, 2010, pages.

*Primary Examiner* — Saul Rodriguez
*Assistant Examiner* — Willie Berry, Jr.
(74) *Attorney, Agent, or Firm* — Foley & Lardner LLP (57) ABSTRACT

A winch assembly includes a first bracket configured to be positioned at a first lateral side of a vehicle, a second bracket configured to be positioned at a second lateral side of the vehicle, a first actuator and a second actuator configured to be coupled to a winch free spool device, a first bushing coupled to the first actuator, a second bushing coupled to the second actuator, and a lever arm coupled to both the first actuator and the second actuator and configured to interface with the winch free spool device. The first actuator and the second actuator are moveable to position the first bushing into engagement with the first bracket or position the second bushing into engagement with the second bracket to selectively lock the winch free spool device in an engaged position.

20 Claims, 9 Drawing Sheets

(51) Int. Cl.
  *G05G 1/01* (2008.04)
  *G05G 11/00* (2006.01)
  *B60P 3/12* (2006.01)
  *G05G 5/06* (2006.01)

(52) U.S. Cl.
  CPC .......... *G05G 5/06* (2013.01); *Y10T 74/20207* (2015.01); *Y10T 74/20468* (2015.01)

(56) References Cited

U.S. PATENT DOCUMENTS

| | | |
|---|---|---|
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,971,694 A | 10/1999 | McNeilus et al. |
| 5,984,609 A | 11/1999 | Bartlett |
| 6,033,176 A | 3/2000 | Bartlett |
| 6,062,803 A | 5/2000 | Christenson |
| 6,089,813 A | 7/2000 | McNeilus et al. |
| 6,120,235 A | 9/2000 | Humphries et al. |
| 6,123,500 A | 9/2000 | McNeilus et al. |
| 6,210,094 B1 | 4/2001 | McNeilus et al. |
| 6,213,706 B1 | 4/2001 | Christenson |
| 6,224,318 B1 | 5/2001 | McNeilus et al. |
| 6,315,515 B1 | 11/2001 | Young et al. |
| 6,336,783 B1 | 1/2002 | Young et al. |
| 6,350,098 B1 | 2/2002 | Christenson et al. |
| 6,447,239 B2 | 9/2002 | Young et al. |
| 6,474,928 B1 | 11/2002 | Christenson |
| 6,565,305 B2 | 5/2003 | Schrafel |
| 7,070,382 B2 | 7/2006 | Pruteanu et al. |
| 7,284,943 B2 | 10/2007 | Pruteanu et al. |
| 7,556,468 B2 | 7/2009 | Grata |
| 7,559,735 B2 | 7/2009 | Pruteanu et al. |
| 7,878,750 B2 | 2/2011 | Zhou et al. |
| 8,182,194 B2 | 5/2012 | Pruteanu et al. |
| 8,215,892 B2 | 7/2012 | Calliari |
| 8,360,706 B2 | 1/2013 | Addleman et al. |
| 8,540,475 B2 | 9/2013 | Kuriakose et al. |
| 8,807,613 B2 | 8/2014 | Howell et al. |
| 9,216,856 B2 | 12/2015 | Howell et al. |
| 9,387,985 B2 | 7/2016 | Gillmore et al. |
| 2013/0056612 A1 | 3/2013 | Cheng |
| 2015/0016931 A1 | 1/2015 | Kuriakose et al. |
| 2017/0121108 A1 | 5/2017 | Davis et al. |
| 2017/0225888 A1 | 8/2017 | Betz et al. |
| 2017/0341860 A1 | 11/2017 | Dodds et al. |

FOREIGN PATENT DOCUMENTS

| | | |
|---|---|---|
| WO | WO-2006/045069 | 4/2006 |
| WO | WO-2017/176897 | 10/2017 |

* cited by examiner

WINCH MECHANISM FOR A CARRIER TRUCK

CROSS-REFERENCE TO RELATED PATENT APPLICATION

This application is a continuation of U.S. application Ser. No. 13/940,955, filed Jul. 12, 2013, which is incorporated herein by reference in its entirety.

BACKGROUND

Winches for rollback carriers and tow truck vehicles are equipped with a winch free spool device (e.g., a clutch) that disconnects a winch drum from a winch drive mechanism. The winch free spool device allows the winch drum to be turned manually. This feature allows an operator of the winch to unwind the winch line from the winch drum (e.g., to couple an end of the winch line to a towed vehicle) without needing to activate the winch drive mechanism. Once the end of the cable is connected to a vehicle, equipment, or other object to be retrieved with the winch, the winch free spool device is disengaged to actively couple the winch drum to the winch drive mechanism.

The winch free spool device is positioned on the winch and reduces the time needed to extend the end of the winch line to a vehicle, equipment, or other object to be retrieved with the winch. The winch may be positioned at a middle point of a carrier truck bed, at a lateral side of a carrier truck bed, or on another component of the carrier truck (e.g., on a side recovery system). Traditionally, a remote actuation system (e.g., an electric system, a pneumatic system, etc.) allows an operator standing alongside the vehicle to engage or disengage the winch free spool device. Hoses, wires, control switches, valves, and still other components allow these systems to be operated from various locations around the vehicle. However, these components increase the cost of the vehicle, particularly if the vehicle is not otherwise equipped with a pneumatic system. Manual handles may also be used to engage or disengage the winch free spool device. Such remote actuation systems are included on carrier trucks to facilitate engagement and disengagement of the winch free spool device.

SUMMARY

One embodiment of the invention relates to a mechanism for a winch assembly including a first bracket configured to be positioned at a first lateral side of a vehicle, a second bracket configured to be positioned at a second lateral side of the vehicle, a first actuator and a second actuator configured to be coupled to a winch free spool device, a first bushing coupled to the first actuator, a second bushing coupled to the second actuator, and a lever arm coupled to both the first actuator and the second actuator and configured to interface with the winch free spool device. The first actuator and the second actuator are moveable to position the first bushing into engagement with the first bracket or position the second bushing into engagement with the second bracket to selectively lock the winch free spool device in an engaged position.

Another embodiment of the invention relates to a mechanism for a winch assembly including a first bracket and a second bracket configured to be positioned apart from one another on a vehicle, a first actuator and a second actuator configured to be coupled to a clutch, a first bushing extending outward from the first actuator, a second bushing extending outward from the second actuator, and a lever arm coupled to both the first actuator and the second actuator and configured to interface with the clutch. The clutch is configured to selectively couple a spool of the winch assembly to a drive mechanism. The first actuator and the second actuator are moveable to position the first bushing into engagement with the first bracket or position the second bushing into engagement with the second bracket to selectively lock the clutch in an engaged position, thereby decoupling the spool from the drive mechanism.

Still another embodiment of the invention relates to a vehicle including a chassis having a first lateral side and an opposing second lateral side, a winch including a winch free spool device coupled to the chassis, a first bracket positioned at the first lateral side of the vehicle, a second bracket positioned at the second lateral side of the vehicle, a first actuator and a second actuator coupled to the winch free spool device, a first bushing coupled to the first actuator, a second bushing coupled to the second actuator, and a lever arm coupled to both the first actuator and the second actuator and configured to interface with the winch free spool device. The first actuator and the second actuator are moveable to position the first bushing into engagement with the first bracket or position the second bushing into engagement with the second bracket to selectively lock the winch free spool device in an engaged position.

The invention is capable of other embodiments and of being carried out in various ways. Alternative exemplary embodiments relate to other features and combinations of features as may be generally recited in the claims.

BRIEF DESCRIPTION OF THE DRAWINGS

The invention will become more fully understood from the following detailed description taken in conjunction with the accompanying drawings wherein.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
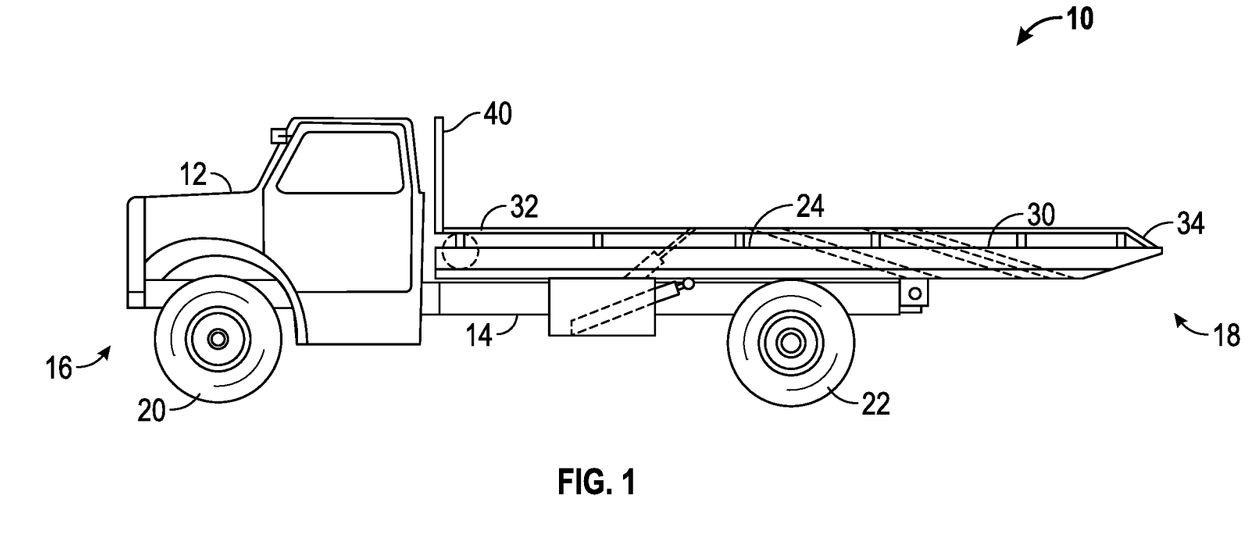
FIG. 1 is a side plan view of a carrier truck, according to an exemplary embodiment.
Figure 2:
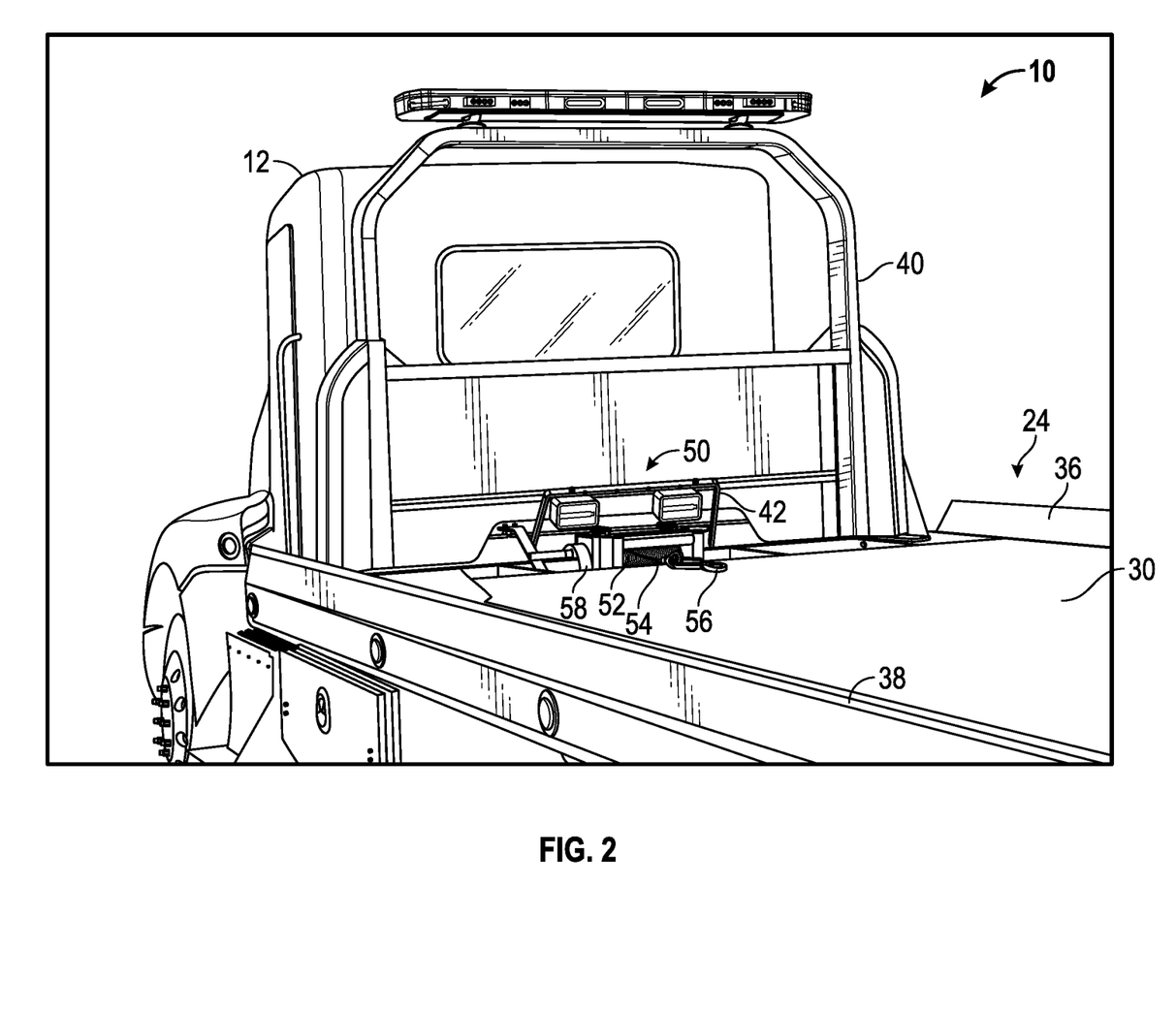
FIG. 2 is a rear perspective view of a carrier truck, according to an exemplary embodiment.

Referring to the exemplary embodiment shown in FIGS. 1-2, a vehicle, shown as carrier truck 10 includes a cab 12 and a chassis, shown as frame 14. Frame 14 is a support structure for the components of carrier truck 10. According to an exemplary embodiment, frame 14 includes first and second frame members that are arranged in parallel. The frame members extend along a longitudinal direction (e.g., a fore and aft direction) between a front end 16 (e.g., a forward portion of carrier truck 10 proximate cab 12) and a rear end 18 (e.g., a rearward portion of carrier truck 10). A centerline of carrier truck 10 extends parallel to the longitudinal direction between the first and second frame members. The first and second frame members are elongated structural members (e.g., a beam, channel, tubing, extrusion, etc.), according to an exemplary embodiment. The first and second frame members are laterally spaced and define a void or cavity therebetween. The cavity may provide an area for effectively concealing or otherwise mounting certain components of the carrier truck 10.

According to an exemplary embodiment, a plurality of wheels are rotatably coupled to frame 14. According to the exemplary embodiment shown in FIG. 1, carrier truck 10 includes six wheels with a single wheel axle set 20 at front end 16 of carrier truck 10 and a dual wheel axle set 22 at rear end 18 of carrier truck 10. According to an exemplary embodiment, single wheel axle set 20 at front end 16 is steerable while dual wheel axle set 22 at rear end 18 is configured to be driven (e.g., by an engine, by motors, etc.). Carrier truck 10 may have any number of wheel configurations including four, eight, or eighteen wheels, among other alternatives.

According to an exemplary embodiment, cab 12 is supported by frame 14. Cab 12 includes a seat and an enclosure to facilitate operation of carrier truck 10 by a driver. In some embodiments, cab 12 includes still other components utilized by the driver during operation of carrier truck 10 (e.g., hydraulic controls, switches, steering wheel, etc.).

As shown in FIG. 1, carrier truck 10 includes a bed assembly, shown as platform 24. According to an exemplary embodiment, platform 24 is movably coupled to the frame 14 and includes a fore end 32 and an aft end 34. Platform 24 defines a bed surface 30 configured to support a vehicle, according to an exemplary embodiment. Carrier truck 10 may further include a headboard 40 coupled to the fore end 32 of the platform 24. According to an exemplary embodiment, platform 24 is moveable relative to frame 14 between a loading position and a transport position. In the loading position, bed surface 30 forms an inclined ramp with the ground (e.g., to facilitate pulling a vehicle onto platform 24. Platform 24 may be moveable via a hydraulic system that is controlled from cab 12 or from a control panel provided elsewhere on carrier truck 10 (e.g., proximate the aft end 34, proximate the headboard 40, etc.).

Referring to FIG. 2, carrier truck 10 includes a winch 50, according to an exemplary embodiment. Winch 50 may be used, by way of example, to pull an object onto platform 24. In some embodiments, winch 50 is used to pull a vehicle (e.g., automobile, tractor, construction vehicle, recreational vehicle etc.) onto platform 24. In other embodiments, winch 50 is used to pull equipment (e.g., construction equipment, etc.) or another object onto platform 24. According to an exemplary embodiment, winch 50 includes a line 54 (e.g., wire rope, cable, etc.) wound around a spool 52. Spool 52 is rotatably coupled to a drive mechanism (e.g., a hydraulic drive mechanism, an electric drive mechanism, etc.). A free end of line 54 is coupled to an interfacing element, shown as hook 56. Hook 56 assists in the recovery of the vehicle or object. Tie downs (e.g., chains, cables, straps, etc.) may be used to secure the object to platform 24 (e.g., during transit, etc.). According to an exemplary embodiment, winch 50 is coupled to at least one of platform 24, headboard 40, and frame 14. In other embodiments, winch 50 is coupled to still another component of carrier truck 10. Headboard 40 includes an aperture, shown as opening 42, in which at least one of winch 50 and mechanism for winch 50 is positioned. According to an exemplary embodiment, opening 42 is sized to accommodate different types or models of winches 50, different winch free spool devices, or still other components.

According to an exemplary embodiment, winch 50 includes a winch free spool device, shown as clutch 58. Clutch 58 couples or decouples the spool 52 with the drive mechanism or an intermediate gear train of winch 50. Clutch 58 selectively allows line 54 to freely unwind from spool 52 without needing to power winch 50. According to an exemplary embodiment, clutch 58 conserves energy and reduces wear on winch 50 by reducing use of the winch drive mechanism. Clutch 58 also reduces the time required to extend line 54 (e.g., an operator may pull line 54 from spool 52 faster than unwinding line 54 with the winch drive mechanism).

Figure 3:
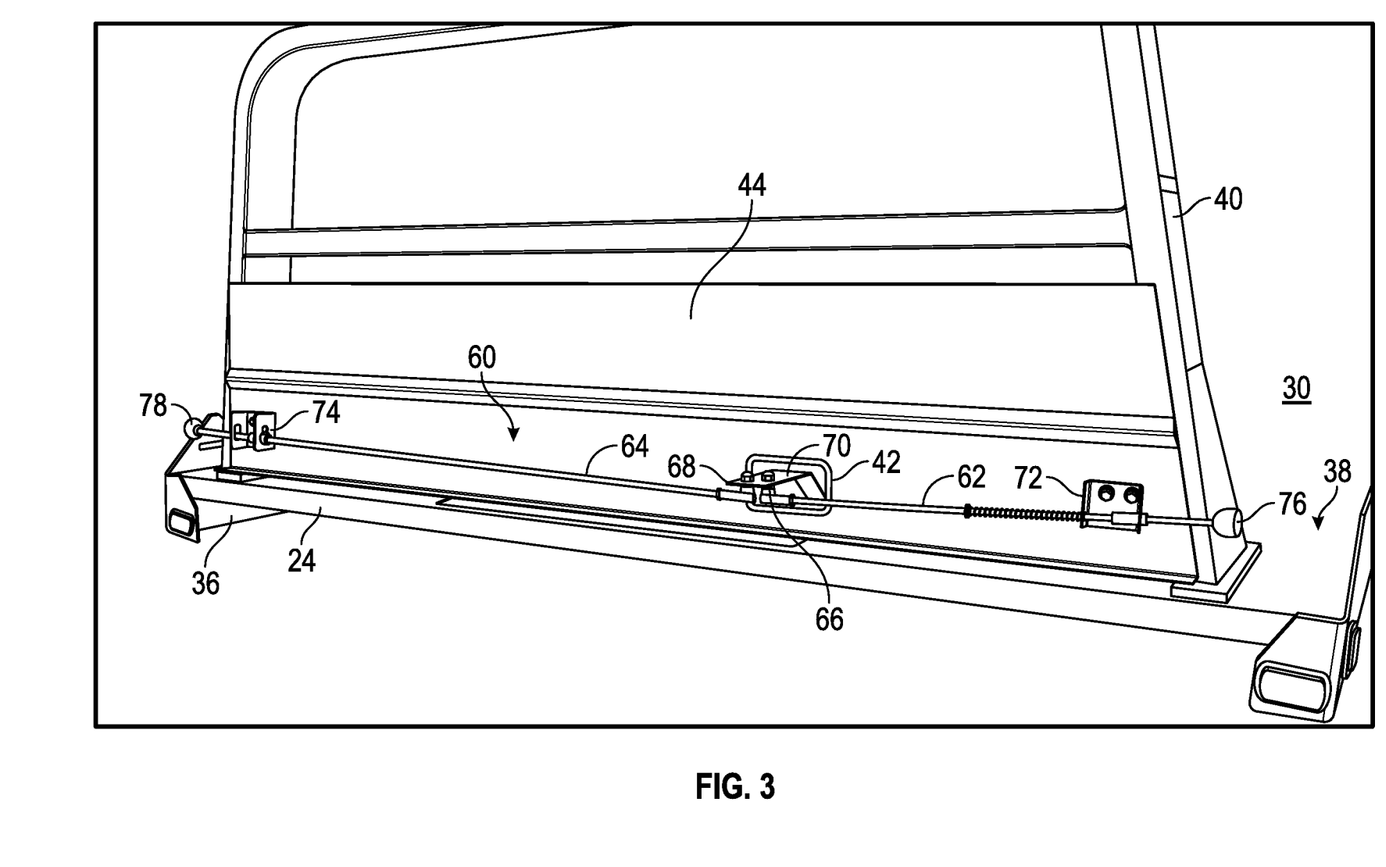
FIG. 3 is a front perspective view of a mechanism for a winch assembly, according to an exemplary embodiment.

Referring next to FIG. 3, the winch free spool device is engaged and disengaged with a mechanism, shown as actuation assembly 60. According to an exemplary embodiment, actuation assembly 60 is accessible from both a right side 36 and a left side 38 of carrier truck 10. Actuation assembly 60 allows an operator to engage or disengage the winch free spool device from either side of the vehicle thereby reducing the need for an operator to walk around a cab or bed to engage and disengage the winch free spool device. According to an exemplary embodiment, actuation assembly 60 remains accessible regardless of the position of platform 24 (e.g., in a loading position, in a transport position, etc.). In one embodiment, at least a portion of actuation assembly 60 is positioned on a front side of headboard 40 and the winch is positioned on the opposite, rear side of headboard 40. In another embodiment, actuation assembly 60 is positioned on the opposite, rear side of the headboard 40. Actuation assembly 60 is coupled to headboard 40, according to an exemplary embodiment. In other embodiments, actuation assembly 60 is coupled to another portion of the vehicle (e.g., platform 24, a chassis, etc.).

Referring again to the exemplary embodiment shown in FIG. 3, actuation assembly 60 includes a first actuator, shown as first rod 62, and a second actuator, shown as a second rod 64. First rod 62 and second rod 64 are coupled to the winch free spool device with a lever arm, shown as lever arm 70, according to an exemplary embodiment. According to an alternative embodiment, at least one of first rod 62 and second rod 64 are directly coupled to the winch free spool device. In one embodiment, lever arm 70 extends through opening 42 in headboard 40 (i.e. opening 42 receives lever arm 70). Actuation assembly 60 engages and disengages the winch free spool device by moving in a lateral direction (e.g., across the longitudinal direction of the vehicle, in a left to right or right to left motion, etc.) thereby pivoting lever arm 70. According to an exemplary embodiment, first rod 62 and second rod 64 are coupled to lever arm 70 with couplers, shown as joint 66 and joint 68. In one embodiment, joint 66 and joint 68 are ball joints (e.g., heim joints) that couple the ends of first rod 62 and second rod 64 to lever arm 70 while allowing first rod 62 and second rod 64 to independently pivot with respect to lever arm 70.

According to an exemplary embodiment, first rod 62 and second rod 64 are positioned along a top surface of lever arm 70. According to the alternative embodiment shown in FIG. 3, first rod 62 and second rod 64 are both positioned along a bottom surface of lever arm 70. In other embodiments, first rod 62 and second rod 64 are positioned on opposite sides of lever arm 70.

According to an exemplary embodiment, first rod 62 and second rod 64 are bar members having a circular cross-sectional shape. According to an alternative embodiment, first rod 62 and second rod 64 have another cross-sectional shape. By way of example, first rod 62 and second rod 64 may have a hexagonal cross-sectional shape, a rectangular cross-sectional shape, a triangular cross-sectional shape, or still another shape (e.g., C-channel, angle, I-beam, T-beam, etc.). First rod 62 and second rod 64 may be solid or may be tubular members (e.g., to reduce weight thereby facilitating manipulation of actuation assembly 60 by an operator, etc.). According to an exemplary embodiment, the first rod 62 and second rod 64 are metal (e.g., steel, aluminum, etc.). In other embodiments, first rod 62 and second rod 64 may be a polymer, a composite, or still another material.

Referring still to the exemplary embodiment shown in FIG. 3, first rod 62 interfaces with a first bracket, shown as first channel 72, and second rod 64 interfaces with a second bracket, shown as a second channel 74. According to an exemplary embodiment, first channel 72 and second channel 74 define apertures configured to receive a portion of first rod 62 and second rod 64, respectively. Movement of first rod 62 and second rod 64 relative to first channel 72 and second channel 74 selectively engages or disengages the winch free spool mechanism. As shown in FIG. 3, a first end member, shown as handle 76, and a second end member, shown as handle 78, are coupled to outer ends of first rod 62 and second rod 64, respectively. Handle 76 and handle 78 may be grasped by an operator thereby facilitating movement of actuation assembly 60. By way of example, such movement may be lateral (e.g., after an operator pushes or pulls handle 76 or handle 78) or angular (e.g., after an operator lifts or lowers handle 76 or handle 78), among other alternatives. According to an exemplary embodiment, first rod 62 and first channel 72 are configured to be positioned on a first lateral side of a chassis (e.g., left side 38), and second rod 64 and second channel 74 are configured to be positioned on a second lateral side of a chassis (e.g., right side 36). According to another exemplary embodiment, the position of first rod 62 and first channel 72 may be reversed with the position of second rod 64 and second channel 74.

Figure 4:
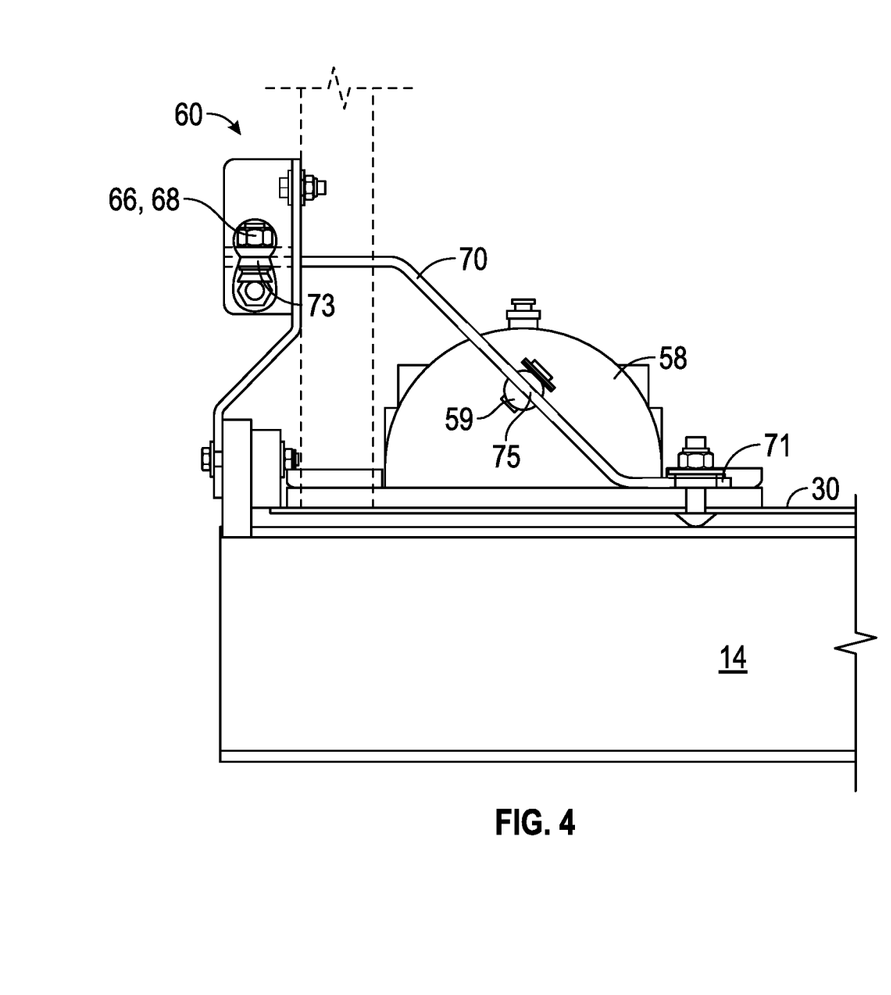
FIG. 4 is a sectional view of a mechanism for a winch assembly, according to an exemplary embodiment.
Figure 5:
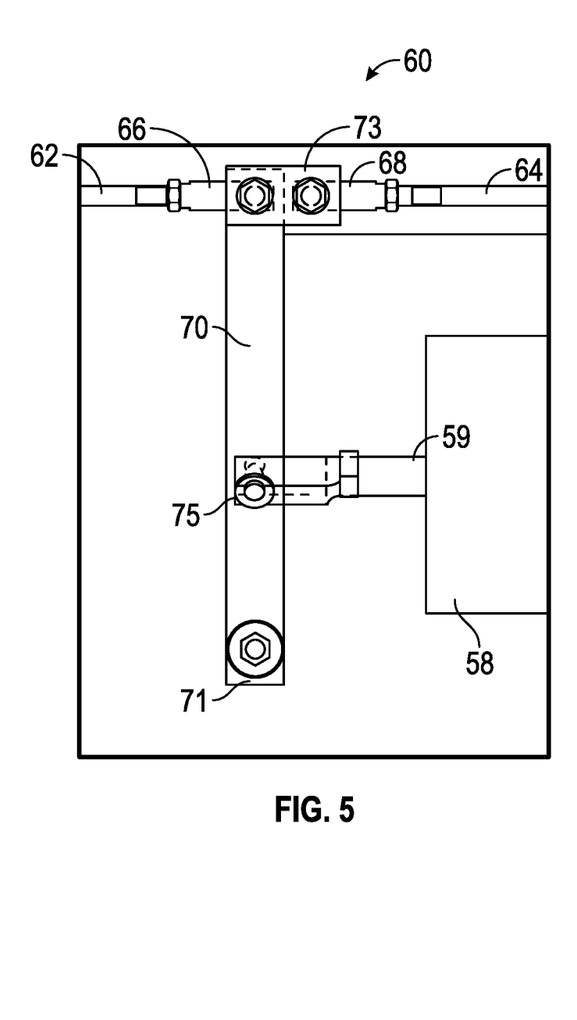
FIG. 5 is a partial top plan view of a mechanism for a winch assembly, according to an exemplary embodiment.

Referring next to FIGS. 4-5, a first end 71 of lever arm 70 is pivotally coupled to bed surface 30. According to an exemplary embodiment, movement of actuation assembly 60 pivots lever arm 70 about a bolt passing through an opening in first end 71. Lever arm 70 is coupled to joint 66 and joint 68 at a second end 73. An intermediate portion 75 of lever arm 70 is coupled to clutch 58 with a clutch lever 59. As shown in FIGS. 4-5, intermediate portion 75 is coupled to clutch lever 59 with a pinned connection. Lever arm 70 forms a second-class lever and provides a mechanical advantage to an operator engaging or disengaging clutch 58 with actuation assembly 60.

Figure 6:
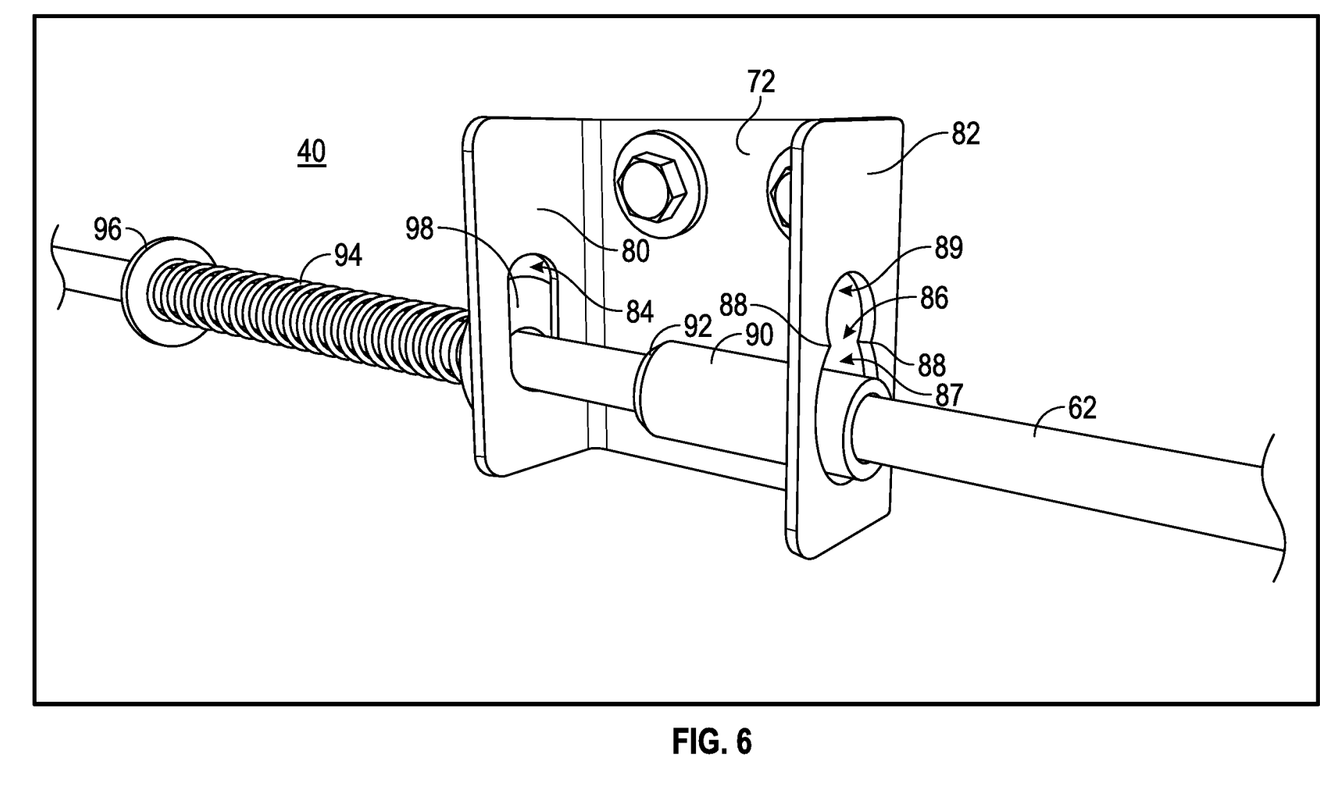
FIG. 6 is a front perspective view of a first bracket and a first link assembly, according to an exemplary embodiment.

Referring next to FIG. 6, first channel 72 includes a first sidewall, shown as first leg 80, and a second sidewall, shown as second leg 82. In one embodiment, first channel 72 is coupled to a front surface of headboard 40 (i.e. the surface of headboard 40 facing the cab of the vehicle). According to an exemplary embodiment, second leg 82 is parallel to the first leg 80 and is positioned laterally outward from first leg 80. According to an alternative embodiment, first channel 72 does not include first leg 80.

Referring still to FIG. 6, a bushing, shown as bullet 90, is coupled to first rod 62. As shown in FIG. 6, bullet 90 is tubular and includes a bore that receives first rod 62 therethrough. In one embodiment, bullet 90 is a component that is coupled (e.g., with an interference fit, with a fastener, with an adhesive, welded, etc.) to first rod 62. In another embodiment, bullet 90 is integrally formed with first rod 62. According to an exemplary embodiment, a projection, shown as boss 92, is coupled to an inner end of bullet 90 (i.e. the end of bullet 90 configured to be positioned nearer to the centerline of the vehicle). In other embodiments, boss 92 is positioned along the length of bullet 90 (e.g., at a middle portion of bullet 90). According to an exemplary embodiment, boss 92 extends laterally inward from bullet 90. As shown in FIG. 6, boss 92 tapers from a first diameter at a proximate end (e.g., the end positioned along bullet 90) to a second diameter at a distal end (e.g., the end spaced from bullet 90 by boss 92). Boss 92 defines an interface surface extending between the proximate end and the distal end. As shown in FIG. 6, the interface surface is frusto-conical. In one embodiment, boss 92 is integrally formed with bullet 90. In other embodiments, boss 92 is a separate component that is coupled to bullet 90.

Movement of first rod 62 actuates the winch free spool device between an engaged position and a disengaged position. According to an exemplary embodiment, boss 92 engages first channel 72 to selectively lock the winch free spool device in the engaged position. In the engaged position, the winch free spool device decouples the drive mechanism of the winch from the spool, thereby allowing line to be freely pulled from the winch. In the disengaged position, the drive mechanism of the winch is coupled to the spool, thereby allowing for the retrieval of a load (e.g., to pull a disabled vehicle onto the bed of a carrier truck).

As shown in FIG. 6, second leg 82 of first channel 72 defines an aperture, shown as opening 86, that receives first rod 62. According to an exemplary embodiment, opening 86 includes a lower portion 87 and an upper portion 89. As shown in FIG. 6, lower portion 87 is oval-shaped. In other embodiments, lower portion 87 has another shape (e.g., circular, rectangular, slotted, etc.). According to the exemplary embodiment shown in FIG. 6, upper portion 89 is circular. According to alternative embodiments, upper portion 89 has another shape (e.g., oval-shaped, rectangular, slotted, etc.). As shown in FIG. 6, first rod 62 extends through both opening 86 of second leg 82 and an aperture, shown as slot 84, in first leg 80.

Lower portion 87 of opening 86 is sized to receive bullet 90 and boss 92 therethrough. By way of example, lower portion 87 of opening 86 may have a dimension (e.g., a width, a height, an inner diameter etc.) that is larger than a dimension of bullet 90 and boss 92 (e.g., a width, a height, an outer diameter, etc.). According to an exemplary embodiment, the distal end of boss 92 may be positioned at least partially into upper portion 89 of opening 86 such that the interface surface engages an edge of second leg 82 around upper portion 89. In one embodiment, a surface of upper portion 89 is shaped to correspond with the interface surface of boss 92. Upper portion 89 of opening 86 is sized to facilitate such engagement. By way of example, upper portion 89 of opening 86 may have a dimension (e.g., a width, a height, an inner diameter etc.) that is smaller than an outer dimension of boss 92 but smaller than an inner dimension of boss 92. In other embodiments, boss 92 is L-shaped and includes a first leg extending radially outward from bullet 90 and a second leg extending laterally inward from the first leg. The second leg may extend at least partially through upper portion 89 to selectively lock the winch free spool device in the engaged position. In other embodiments, boss 92 and upper portion 89 are otherwise cooperatively shaped to limit movement of first rod 62 relative to first channel 72.

According to the exemplary embodiment shown in FIG. 6, upper portion 89 of opening 86 merges into lower portion 87 of opening 86. As shown in FIG. 6, lower portion 87 and upper portion 89 of opening 86 are separated by a pair of inwardly-extending cusps 88. According to an exemplary embodiment, the inner points of cusps 88 are spaced apart a distance that is greater than the diameter of first rod 62. The spacing between cusps 88 facilitates movement of first rod 62 between lower portion 87 and upper portion 89 (e.g., when an operator pulls on first rod 62 thereby removing bullet 90 from opening 86, etc.). According to an alternative embodiment, opening 86 is formed from two separate apertures (i.e. upper portion 89 may be a separate aperture from lower portion 87). By way of example, upper portion 89 may be shaped to interface with a portion of boss 92 (e.g., a second leg of an L-shaped boss), and lower portion 87 may be shaped to receive bullet 90 and boss 92 (e.g., slotted and sized to receive bullet 90 and both legs of an L-shaped boss 92).

First rod 62 is moveable relative to first channel 72 between a lower position in which first rod 62 is positioned in lower portion 87 of opening 86 and an upper position in which boss 92 engages upper portion 89 of opening 86. With first rod 62 in the lower position, the mechanism disengages the free spool mechanism. With first rod 62 in the upper position, the mechanism engages the free spool mechanism.

Referring still to the exemplary embodiment shown in FIG. 6, a resilient member, shown as coil spring 94, is positioned to bias first rod 62 laterally inward. According to an exemplary embodiment, coil spring 94 is provided between first leg 80 of first channel 72 and an annular disk 96 fixed to first rod 62. With coil spring 94 in an equilibrium state (e.g., uncompressed, under a specified pre-load, etc.), bullet 90 extends through lower portion 87 of opening 86 (e.g., with boss 92 positioned between first leg 80 and second leg 82). An operator may pull first rod 62 laterally outward (e.g., by grasping the handle), thereby compressing coil spring 94. As first rod 62 is pulled laterally outward a sufficient distance to allow the bullet 90 to pass completely through the opening 86, the operator may pivot first rod 62 upward such that first rod 62 moves between cusps 88 and into upper portion 89 of opening 86. The biasing force of the compressed coil spring 94 may pull first rod 62 laterally inward until the interface surface of boss 92 contacts the edge of second leg 82 around upper portion 89. Coil spring 94 and the engagement of the interface surface of boss 92 retain first rod 62 in the upper position thereby preventing first rod 62 from dropping into lower portion 87. With first rod 62 in the upper position, the winch free spool device is selectively locked in the engaged position.

According to an exemplary embodiment, a bearing member, shown as washer 98, is provided between coil spring 94 and first leg 80 of first channel 72. Washer 98 prevents the end of coil spring 94 from protruding into slot 84. Washer 98 reduces friction forces that may resist the vertical movement of first rod 62 in the slot 84 and opening 86 of first channel 72. According to an exemplary embodiment, washer 98 is polymeric (e.g., nylon). Washer 98 formed from a material having a low coefficient of friction reduces the likelihood that friction between washer 98 and first leg 80 will unintentionally retain first rod 62 in upper portion 89 of opening 86 (e.g., in the upper position). Coil spring 94 has a spring rate (e.g., k-value) and pre-load that facilitates movement of first rod 62 when actuated from the opposite side with second rod 64, as will be described in more detail below. According to an exemplary embodiment, coil spring 94 has a spring rate of between approximately 2.0 and 2.5 pounds per inch.

Figure 7:
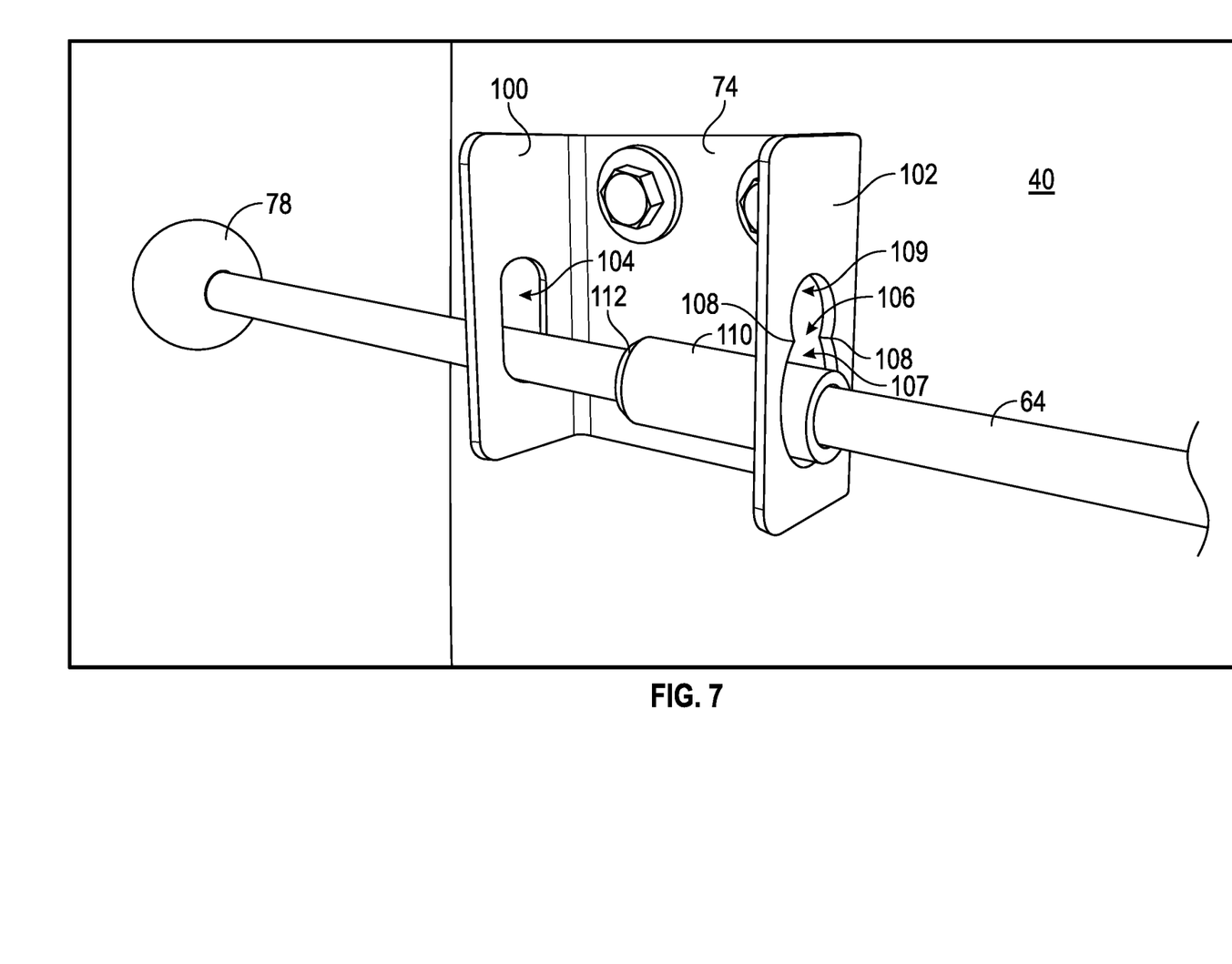
FIG. 7 is a front perspective view of a second bracket and a second link assembly, according to an exemplary embodiment.

Referring next to FIG. 7, second channel 74 includes a first sidewall, shown as first leg 100, and a second sidewall, shown as second leg 102. In one embodiment, second channel 74 is coupled to a front surface of headboard 40 (i.e. the surface of headboard 40 facing the cab of the vehicle). According to an exemplary embodiment, second leg 102 is parallel to the first leg 100 and is positioned laterally outward from first leg 100. According to an alternative embodiment, second channel 74 does not include first leg 100.

Referring still to FIG. 7, a second bushing, shown as bullet 110, is coupled to second rod 64. As shown in FIG. 7, bullet 110 is tubular and includes a bore that receives second rod 64 therethrough. In one embodiment, bullet 110 is a component that is coupled to second rod 64. In another embodiment, bullet 110 is integrally formed with second rod 64. According to an exemplary embodiment, a second projection, shown as boss 112, is coupled to an outer end of bullet 110 (i.e. the end of bullet 110 configured to be positioned further from the centerline of the vehicle). In other embodiments, boss 112 is positioned along the length of bullet 110 (e.g., at a middle portion of bullet 110). According to an exemplary embodiment, boss 112 extends laterally outward from bullet 110. As shown in FIG. 7, boss 112 tapers from a first diameter at a proximate end (e.g., the end positioned along bullet 110) to a second diameter at a distal end (e.g., the end spaced from bullet 110 by boss 112). Boss 112 defines an interface surface extending between the proximate end and the distal end. As shown in FIG. 7, the interface surface is frusto-conical. In one embodiment, boss 112 is integrally formed with bullet 110. In other embodiments, boss 112 is a separate component that is coupled to bullet 110.

Movement of second rod 64 actuates the winch free spool device between an engaged position and a disengaged position. According to an exemplary embodiment, boss 112 engages second channel 74 to selectively lock the winch free spool device in the engaged position. In the engaged position, the winch free spool device decouples the drive mechanism of the winch from the spool, thereby allowing line to be freely pulled from the winch. In the disengaged position, the drive mechanism of the winch is coupled to the spool, thereby allowing for the retrieval of a load.

As shown in FIG. 7, second leg 102 of second channel 74 defines an aperture, shown as opening 106, that receives second rod 64. According to an exemplary embodiment, opening 106 includes a lower portion 107 and an upper portion 109. As shown in FIG. 7, lower portion 107 is oval-shaped. In other embodiments, lower portion 107 has another shape (e.g., circular, rectangular, slotted, etc.). According to the exemplary embodiment shown in FIG. 7, upper portion 109 is circular. According to alternative embodiments, upper portion 109 has another shape (e.g., oval-shaped, rectangular, slotted, etc.). As shown in FIG. 7, second rod 64 extends through both opening 106 of second leg 102 and an aperture, shown as slot 104, in first leg 100.

Lower portion 107 of opening 106 is sized to receive bullet 110 and boss 112 therethrough. By way of example, lower portion 107 of opening 106 may have a dimension (e.g., a width, a height, an inner diameter etc.) that is larger than a dimension of bullet 110 and boss 112 (e.g., a width, a height, an outer diameter, etc.). According to an exemplary embodiment, the distal end of boss 112 may be positioned at least partially into upper portion 109 of opening 106 such that the interface surface engages an edge of second leg 102 around upper portion 109. In one embodiment, a surface of upper portion 109 is shaped to correspond with the interface surface of boss 112. Upper portion 109 of opening 106 is sized to facilitate such engagement. By way of example, upper portion 109 of opening 106 may have a dimension (e.g., a width, a height, an inner diameter etc.) that is smaller than an outer dimension of boss 112 but smaller than an inner dimension of boss 112. In other embodiments, boss 112 is L-shaped and includes a first leg extending radially outward from bullet 110 and a second leg extending laterally outward from the first leg. The second leg may extend at least partially through upper portion 109 to selectively lock the winch free spool device in the engaged position. In other embodiments, boss 112 and upper portion 109 are otherwise cooperatively shaped to limit movement of second rod 64 relative to second channel 74.

According to the exemplary embodiment shown in FIG. 7, upper portion 109 of opening 106 merges into lower portion 107 of opening 106. As shown in FIG. 7, lower portion 107 and upper portion 109 of opening 106 are separated by a pair of inwardly-extending cusps 108. According to an exemplary embodiment, the inner points of cusps 108 are spaced apart a distance that is greater than the diameter of second rod 64. The spacing between cusps 108 facilitates movement of second rod 64 between lower portion 107 and upper portion 109 (e.g., when an operator pushes on second rod 64 thereby removing bullet 110 from opening 106, etc.). According to an alternative embodiment, opening 106 is formed from two separate apertures (i.e. upper portion 109 may be a separate aperture from lower portion 107). By way of example, upper portion 109 may be shaped to interface with a portion of boss 112 (e.g., a second leg of an L-shaped boss), and lower portion 107 may be shaped to receive bullet 110 and boss 112 (e.g., slotted and sized to receive bullet 110 and both legs of an L-shaped boss 112).

Second rod 64 is moveable relative to second channel 74 between a lower position in which second rod 64 is positioned in lower portion 107 of opening 106 and an upper position in which boss 112 engages upper portion 109 of opening 106. With second rod 64 in the lower position, the mechanism disengages the free spool mechanism. With second rod 64 in the upper position, the mechanism engages the free spool mechanism.

An operator may push second rod 64 laterally inward, thereby compressing the resilient member. As second rod 64 is pushed laterally inward a distance that allows bullet 110 to pass completely through opening 106, the operator may pivot second rod 64 upward such that second rod 64 moves between cusps 108 and into upper portion 109 of opening 106. A biasing force from the compressed resilient member pushes second rod 64 laterally outward until the interface surface of boss 112 contacts the edge of second leg 102 around upper portion 109. The biasing force and the engagement of the interface surface of boss 112 retain second rod 64 in the upper position, thereby preventing second rod 64 from dropping into lower portion 107. With second rod 64 in the upper position, the winch free spool device is selectively locked in the engaged position.

Figure 8A:
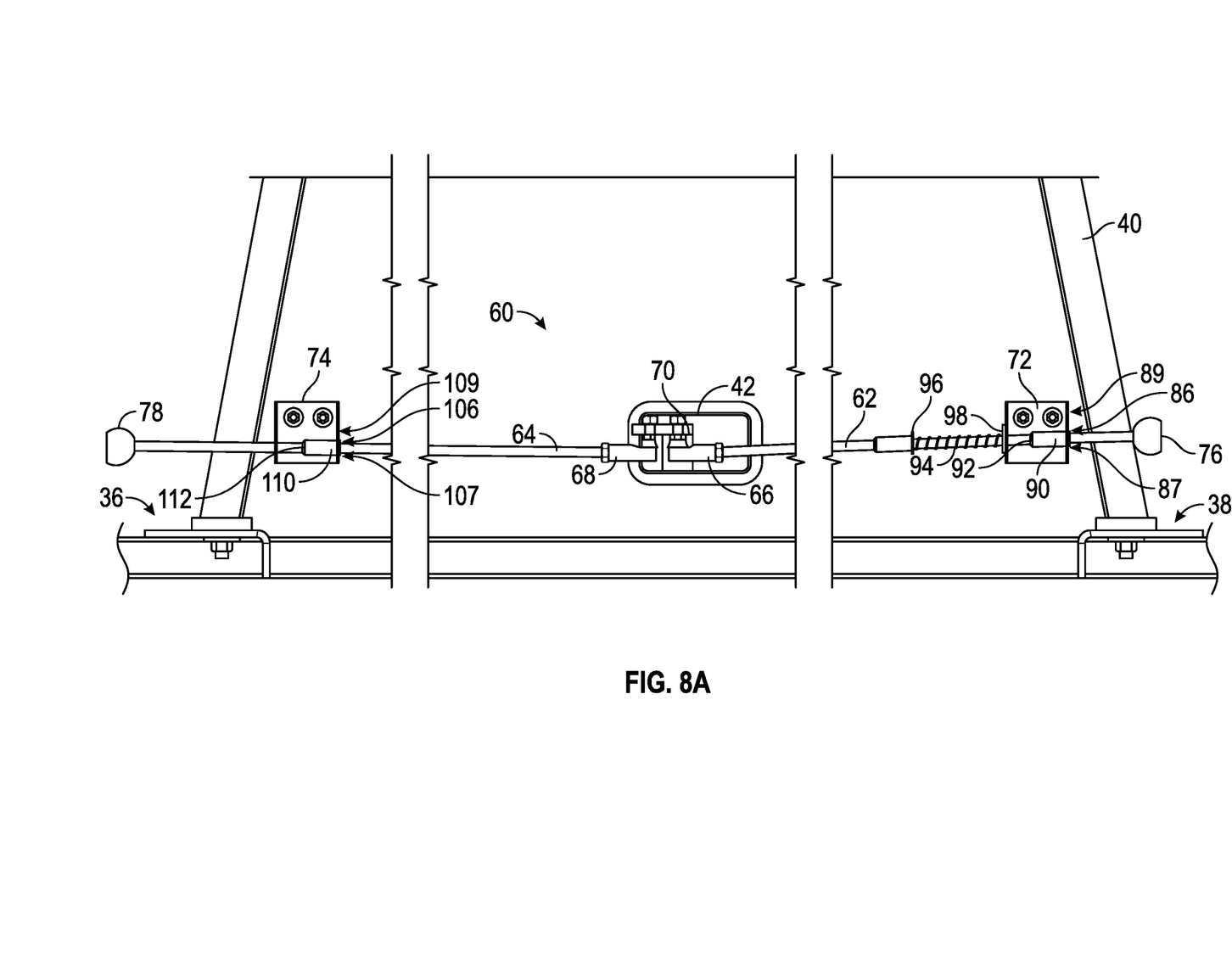
FIG. 8A is a front plan view of a mechanism for a winch assembly in a first position, according to an exemplary embodiment.
Figure 8B:
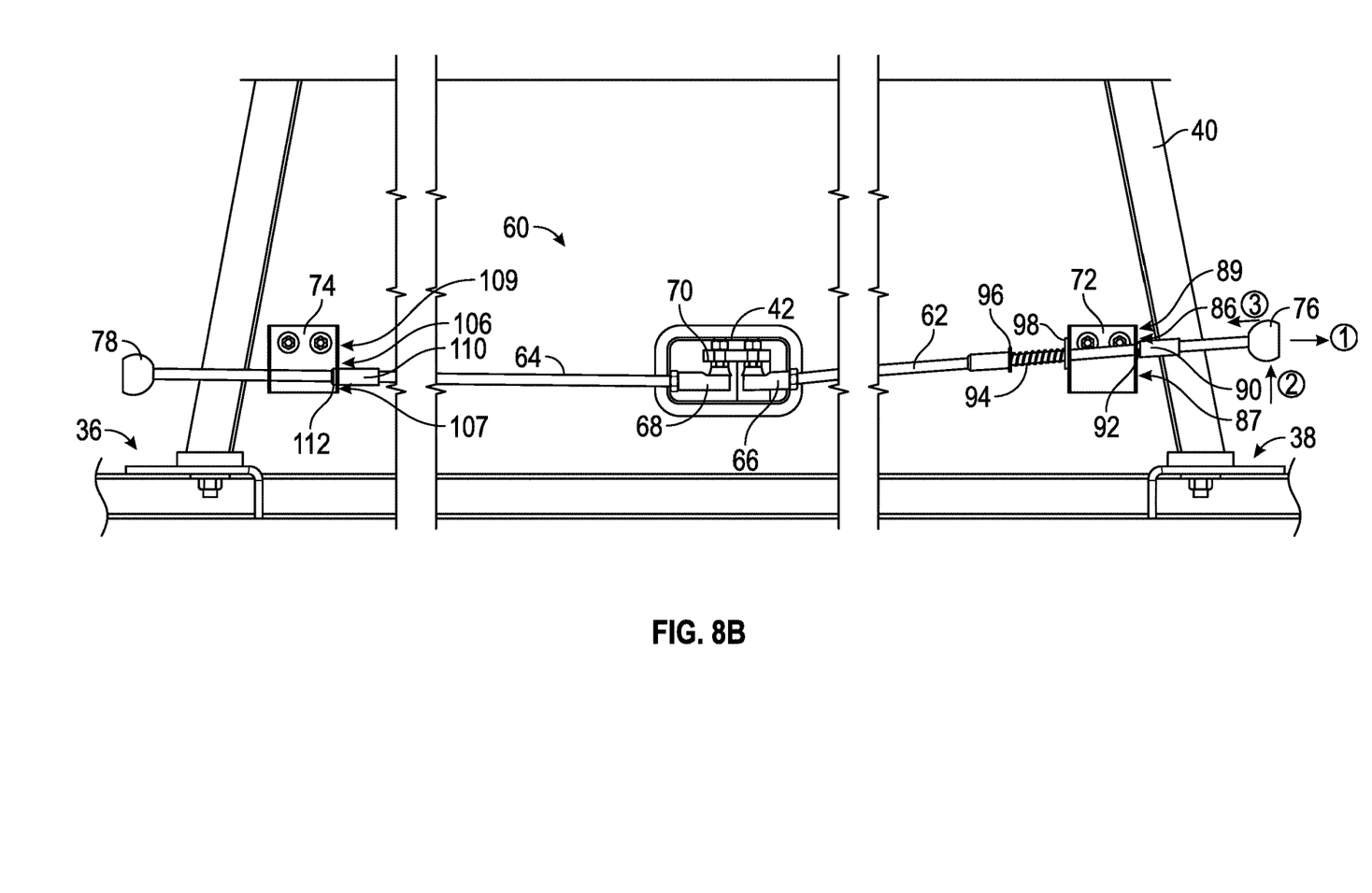
FIG. 8B is a front plan view of a mechanism for a winch assembly in a second position, according to an exemplary embodiment.
Figure 8C:
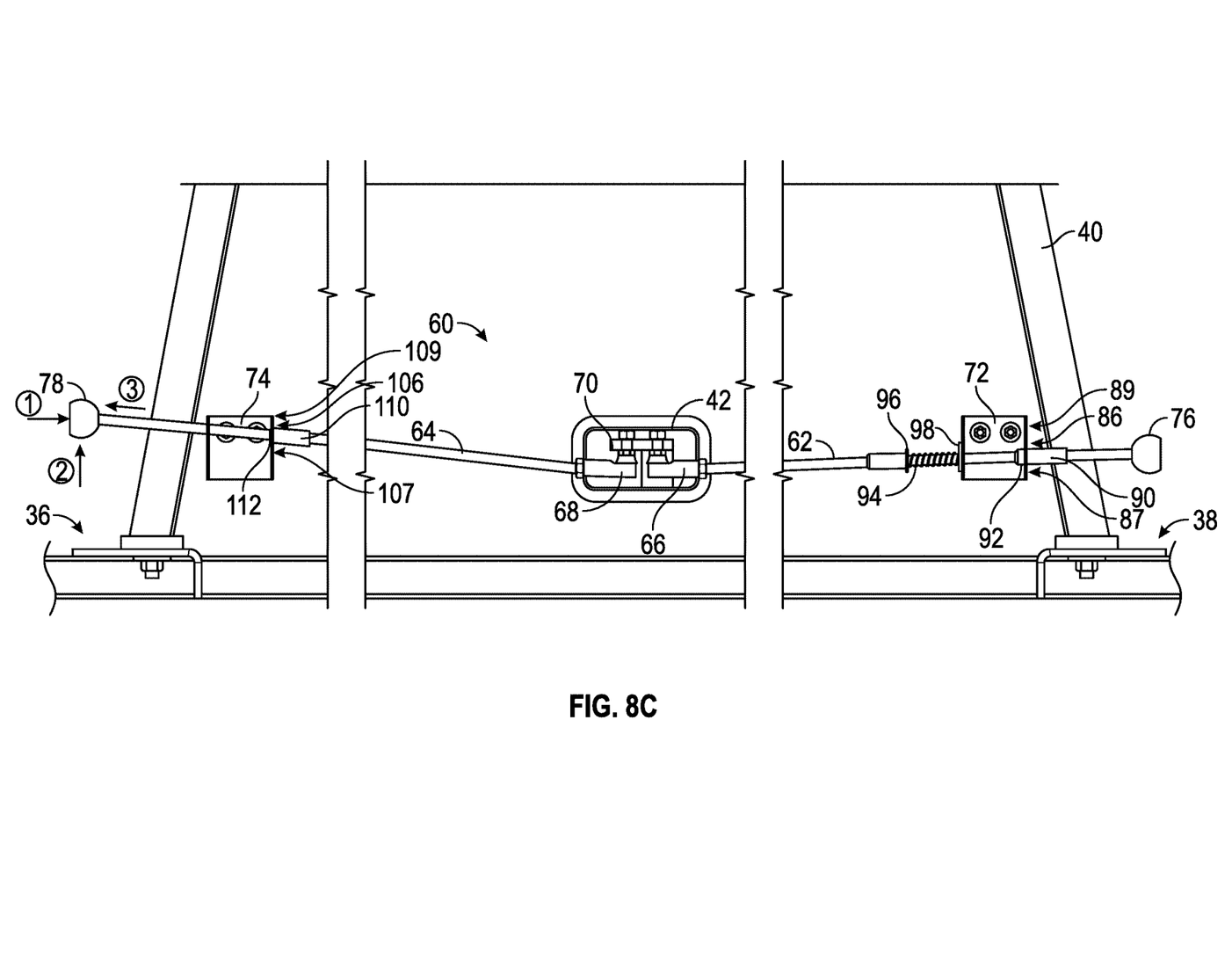
FIG. 8C is a front plan view of a mechanism for a winch assembly in a third position, according to an exemplary embodiment.

Referring next to FIGS. 8A-8C, actuation assembly 60 is moveable between three positions. In a first position shown in FIG. 8A, the winch free spool device is disengaged. In a second position and a third position shown in FIGS. 8B-8C, respectively, the winch free spool device is engaged. As FIGS. 8A-8C are views from the front of the vehicle, it should be understood that right side 36 of the vehicle is shown on the left sides of FIGS. 8A-8C while left side 38 of the vehicle is shown on the right sides of FIGS. 8A-8C. As shown in FIGS. 8B-8C, the winch free spool device may be engaged or disengaged from either lateral side of the vehicle (e.g., both right side 36 and left side 38 of the vehicle). Such dual-sided operation reduces the need for an operator to walk around the vehicle to engage or disengage the winch free spool device, thereby saving the operator time and effort. According to an exemplary embodiment, opening 86 and opening 106 are positioned on sidewalls of first channel 72 and second channel 74 that are closer to left side 38. Movement of actuation assembly 60 generates similar movement of bullet 90 and bullet 110 relative to opening 86 and opening 106, respectively. According to an alternative embodiment, opening 86 and opening 106 are positioned on sidewalls of first channel 72 and second channel 74 that are closer to right side 36.

Referring specifically to FIG. 8A, actuation assembly 60 is configured in the first position. In the first position, first rod 62 and second rod 64 are positioned in the lower portions 87 and 107 of openings 86 and 106, respectively. According to an exemplary embodiment, first bullet 90 and second bullet 110 are positioned within the lower in the lower portions 87 and 107 of openings 86 and 106, respectively, when actuation assembly 60 is in the first position. Bullets 90 and 110 that remain in openings 86 and 106 during movement of actuation assembly 60 do not impede the lateral movement of first rod 62 or second rod 64. In other embodiments, bullets 90 and 110 do not remain in openings 86 and 106 during movement of actuation assembly 60 (e.g., bullet 110 may fall down the sidewall of second channel 74 as second rod 64 is pulled toward left side 38). A feature (e.g., a tapered portion) may facilitate movement of bullets 90 and 110 into openings 86 and 106. From the first position, an operator may move first rod 62 and second rod 64 in the lateral direction by overcoming the biasing force of coil spring 94. As shown in FIG. 8A, coil spring 94 biases first rod 62 and second rod 64 toward right side 36.

Referring next to FIG. 8B, actuation assembly 60 is configured in the second position whereby first rod 62 pulls lever arm 70 and engages the winch free spool device. An operator may move actuation assembly 60 from the first position to the second position by pulling first rod 62 laterally outward (i.e. toward left side 38) until bullet 90 clears the sidewall of first channel 72. The operator may thereafter lift an outer lateral end of first rod 62 to pivot first rod 62 about joint 66. As first rod 62 pivots upward, washer 98 slides along a sidewall of first channel 72. First rod 62 pivots independently of second rod 64, which remains in a generally horizontal orientation. The operator may finally allow coil spring 94 to force boss 92 into engagement with upper portion 89 of opening 86. In other embodiments, an operator may lift first rod 62 and thereafter push boss 92 into engagement with upper portion 89 of opening 86. According to an exemplary embodiment, the biasing force and the cooperation of boss 92 with upper portion 89 selectively lock the winch free spool device in the engaged position. In one embodiment, the biasing force and the cooperation of boss 92 with upper portion 89 prevent first rod 62 from falling into lower portion 87 (e.g., due to the weight of first rod 62 and bullet 90, due to vertical loading or vibration, etc.). It should be understood that an operator may pull and lift first rod 62 to engage the winch free spool device from a first lateral side of the vehicle (e.g., to quickly and easily extend the free end of the line and attach a hook to a vehicle).

From the position shown in FIG. 8B, an operator may reconfigure actuation assembly 60 into the first position (i.e. disengage the winch free spool device) from either lateral side of the vehicle. From left side 38, an operator may pull laterally outward on first rod 62, pivot first rod 62 downward, and allow coil spring 94 to force bullet 90 into lower portion 87 of opening 86. From right side 36, an operator may push laterally inward on second rod 64 to disengage boss 92 from upper portion 89 of opening 86. According to an exemplary embodiment, the weight of first rod 62 and bullet 90 rotates first rod 62 downward into lower portion 87 of opening 86. An operator may thereafter allow coil spring 94 to force bullet 90 into lower portion 87 of opening 86. First rod 62 and second rod 64 are biased toward right side 36 until they reach the first position shown in FIG. 8A. In some embodiments, boss 92 provides a lead-in to facilitate entry of bullet 90 into lower portion 87 of opening 86. Bullet 110 may also include a lead-in to facilitate entry of bullet 110 into lower portion 107 of opening 106.

Referring next to FIG. 8C, actuation assembly 60 is configured in the third position whereby second rod 64 pulls lever arm 70 and engages the winch free spool device. An operator may move actuation assembly 60 from the first position to the third position by pushing second rod 64 laterally inward (i.e. toward left side 38) until bullet 110 clears the sidewall of second channel 74. The operator may thereafter lift an outer lateral end of second rod 64 to pivot second rod 64 about joint 68. Second rod 64 pivots independently of first rod 62, which remains in a generally horizontal orientation. The operator may finally allow coil spring 94 to force boss 112 into engagement with upper portion 109 of opening 106. In other embodiments, an operator may lift second rod 64 and thereafter pull boss 112 into engagement with upper portion 109 of opening 106. According to an exemplary embodiment, the biasing force and the cooperation of boss 112 with upper portion 109 selectively lock the winch free spool device in the engaged position. In one embodiment, the biasing force and the cooperation of boss 112 with upper portion 109 prevent second rod 64 from falling into lower portion 107 (e.g., due to the weight of second rod 64 and bullet 110, due to vertical loading or vibration, etc.). It should be understood that an operator may push and lift second rod 64 to engage the winch free spool device from an opposing second lateral side of the vehicle (e.g., to quickly and easily extend the free end of the line and attach a hook to a vehicle).

From the position shown in FIG. 8C, an operator may reconfigure actuation assembly 60 into the first position (i.e. disengage the winch free spool device) from either lateral side of the vehicle. From right side 36, an operator may push laterally inward on second rod 64, pivot second rod 64 downward, and allow coil spring 94 to force bullet 110 into lower portion 107 of opening 106. From left side 38, an operator pull laterally outward on first rod 62 to disengage boss 112 from upper portion 109 of opening 106. According to an exemplary embodiment, the weight of second rod 64 and bullet 110 rotates second rod 64 downward into lower portion 107 of opening 106. An operator may thereafter allow coil spring 94 to force bullet 110 into lower portion 107 of opening 106. First rod 62 and second rod 64 are biased toward right side 36 until they reach the first position shown in FIG. 8A. In some embodiments, boss 112 provides a lead-in to facilitate entry of bullet 110 into lower portion 107 of opening 106. Bullet 90 may also include a lead-in to facilitate entry of bullet 90 into lower portion 87 of opening 86.

Actuation assembly 60 is configured to disengage the winch free spool device by default. As first rod 62 and second rod 64 are positioned lower when in the first position than when in the second or third positions, weight forces due to gravity bias actuation assembly 60 into the first position. Should first channel 72, second channel 74, boss 92, or boss 112 become damaged, the winch free spool device will be disengaged. Further, the winch free spool device is disengaged if boss 92 or boss 112 is decoupled from upper portion 89 or upper portion 109, respectively. Such decoupling may occur, by way of example, due to a sudden impulse force (e.g., while driving over uneven terrain, etc.).

While the terms "upper" and "lower" have been used throughout this discussion, it should be understood that the apertures within the first bracket and the second bracket may be positioned non-vertically (i.e. the apertures may not include "upper" and "lower" portions). By way of example, the apertures may be positioned horizontally or angled and include a forward portion and a rearward portion (e.g., relative to the vehicle). A resilient member may be positioned to bias the first actuator and the second actuator into at least one of the forward portion and the rearward portion. According to still another alternative embodiment, the first bushing and the second bushing are configured to engage the lower portions of the apertures within the first bracket and the second bracket and a resilient member may be positioned to bias the first actuator and the second actuator upward, thereby facilitating movement of the bushings through the upper portions of the apertures.

It is important to note that the construction and arrangement of the elements of the systems as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements. The position of elements may be reversed or otherwise varied, and the nature or number of discrete elements or positions may be altered or varied. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present invention. The order or sequence of any process, logical algorithm, or method steps may be varied or re-sequenced according to alternative embodiments. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A mechanism for a winch assembly, the mechanism comprising:

a first bracket configured to be positioned at a first lateral side of a vehicle and a second bracket configured to be positioned at a second lateral side of the vehicle;

a first actuator and a second actuator configured to be coupled to a winch free spool device;

a first bushing coupled to the first actuator and a second bushing coupled to the second actuator; and a lever arm directly coupled to both the first actuator and the second actuator and configured to interface with the winch free spool device;

wherein the first actuator and the second actuator are moveable to position the first bushing into engagement with the first bracket or position the second bushing into engagement with the second bracket to selectively lock the winch free spool device in an engaged position.

2. The mechanism of claim 1, further comprising a resilient member coupled to the first bracket and the first actuator, wherein the resilient member is configured to bias the winch free spool device into a disengaged position.

3. The mechanism of claim 2, wherein the resilient member is a spring having a k-factor selected to maintain the first bushing in engagement with the first bracket or the second bushing in engagement with the second bracket.

4. The mechanism of claim 1, wherein the first actuator and the second actuator are moveable to position an inner end of the first bushing into engagement with the first bracket or position an outer end of the second bushing into engagement with the second bracket to selectively lock the winch free spool device in the engaged position.

5. The mechanism of claim 1, wherein the first bracket defines an aperture that receives the first actuator, the aperture including an upper portion and a lower portion, wherein the upper portion of the aperture has a different shape than the lower portion of the aperture.

6. The mechanism of claim 5, wherein the lower portion of the aperture is sized to receive the first bushing therethrough and the upper portion of the aperture is sized to engage the first bushing.

7. The mechanism of claim 6, wherein the aperture defines a first aperture, wherein the second bracket defines a second aperture that receives the second actuator, and wherein the second aperture includes a lower portion sized to receive the second bushing therethrough and an upper portion sized to engage the second bushing.

8. The mechanism of claim 7, wherein the first actuator and the second actuator are moveable between:

a first position whereby the first actuator is positioned within the lower portion of the first aperture and the second actuator is positioned within the lower portion of the second aperture;

a second position whereby the first bushing is engaged with the upper portion of the first aperture; and a third position whereby the second bushing is engaged with the upper portion of the second aperture.

9. A mechanism for a winch assembly, the mechanism comprising:

a first bracket and a second bracket configured to be positioned apart from one another on a vehicle;

a first actuator and a second actuator configured to be coupled to a clutch, wherein the clutch is configured to selectively couple a spool of the winch assembly to a drive mechanism;

a first bushing extending outward from the first actuator and a second bushing extending outward from the second actuator; and a lever arm directly coupled to both the first actuator and the second actuator and configured to interface with the clutch;

wherein the first actuator and the second actuator are moveable to position the first bushing into engagement with the first bracket or position the second bushing into engagement with the second bracket to selectively lock the clutch in an engaged position, thereby decoupling the spool from the drive mechanism.

10. The mechanism of claim 9, further comprising a resilient member coupled to the first bracket and the first actuator, wherein the resilient member is configured to bias the clutch into a disengaged position.

11. The mechanism of claim 10, wherein the resilient member is a spring having a k-factor selected to maintain the first bushing in engagement with the first bracket or the second bushing in engagement with the second bracket.

12. The mechanism of claim 9, wherein the first actuator and the second actuator are moveable to position an inner end of the first bushing into engagement with the first bracket or position an outer end of the second bushing into engagement with the second bracket to selectively lock the clutch in the engaged position.

13. The mechanism of claim 9, wherein the first bracket defines an aperture that receives the first actuator, the aperture including an upper portion and a lower portion, wherein the upper portion of the aperture has a different shape than the lower portion of the aperture.

14. The mechanism of claim 13, wherein the lower portion of the aperture is sized to receive the first bushing therethrough and the upper portion of the aperture is sized to engage the first bushing.

15. The mechanism of claim 14, wherein the aperture defines a first aperture, wherein the second bracket defines a second aperture that receives the second actuator, and wherein the second aperture includes a lower portion sized to receive the second bushing therethrough and an upper portion sized to engage the second bushing.

16. The mechanism of claim 15, wherein the first actuator and the second actuator are moveable between:

a first position whereby the first actuator is positioned within the lower portion of the first aperture and the second actuator is positioned within the lower portion of the second aperture;

a second position whereby the first bushing is engaged with the upper portion of the first aperture; and a third position whereby the second bushing is engaged with the upper portion of the second aperture.

17. A vehicle, comprising:

a chassis having a first lateral side and an opposing second lateral side;

a winch coupled to the chassis, the winch including a winch free spool device;

a first bracket positioned at the first lateral side of the vehicle and a second bracket positioned at the second lateral side of the vehicle;

a first actuator and a second actuator coupled to the winch free spool device;

a first bushing directly coupled to the first actuator and a second bushing directly coupled to the second actuator; and a lever arm directly coupled to both the first actuator and the second actuator and configured to interface with the winch free spool device;

wherein the first actuator and the second actuator are moveable to position the first bushing into engagement with the first bracket or position the second bushing into engagement with the second bracket to selectively lock the winch free spool device in an engaged position.

18. The vehicle of claim 17, wherein the first actuator and the second actuator are moveable to position an inner end of the first bushing into engagement with the first bracket or position an outer end of the second bushing into engagement with the second bracket to selectively lock the winch free spool device in the engaged position.

19. The vehicle of claim 17, wherein the first bracket defines an aperture that receives the first actuator, the aperture including an upper portion and a lower portion, wherein the upper portion of the aperture has a different shape than the lower portion of the aperture.

20. The vehicle of claim 19, wherein the lower portion of the aperture is sized to receive the first bushing therethrough and the upper portion of the aperture is sized to engage the first bushing.

* * * * *